United States Patent
Wang et al.

(10) Patent No.: US 8,823,327 B2
(45) Date of Patent: Sep. 2, 2014

(54) ELECTRICAL DEVICE AND BATTERY MANAGEMENT METHOD THEREOF

(75) Inventors: Luna Wang, Taipei Hsien (TW);
Tai-Hang Fu, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 212 days.

(21) Appl. No.: 13/160,282

(22) Filed: Jun. 14, 2011

(65) Prior Publication Data

US 2012/0206106 A1 Aug. 16, 2012

(30) Foreign Application Priority Data

Feb. 10, 2011 (CN) .......................... 2011 1 0035481

(51) Int. Cl.
*H02J 7/00* (2006.01)

(52) U.S. Cl.
CPC ....... *H02J 7/0063* (2013.01); *H02J 2007/0067* (2013.01)
USPC ............................ 320/133; 320/131; 320/136

(58) Field of Classification Search
USPC ................................... 320/131, DIG. 12, 133
See application file for complete search history.

(56) References Cited

U.S. PATENT DOCUMENTS

| 5,942,878 | A * | 8/1999 | Ito ................................. | 320/131 |
| 5,982,143 | A * | 11/1999 | Stuart ........................... | 320/119 |
| 6,137,261 | A * | 10/2000 | Kurle et al. ................... | 320/132 |
| 6,266,776 | B1 * | 7/2001 | Sakai ............................ | 713/300 |
| 6,456,046 | B1 * | 9/2002 | Gaza ............................ | 320/155 |
| 6,598,169 | B1 | 7/2003 | Warwick et al. | |
| 6,771,046 | B2 * | 8/2004 | Ariga et al. ................... | 320/125 |
| 7,034,506 | B2 * | 4/2006 | Chen et al. .................... | 320/136 |
| 8,084,998 | B2 * | 12/2011 | Lampe-Onnerud et al. .. | 320/134 |
| 2005/0024022 | A1 * | 2/2005 | Howard et al. ............... | 320/135 |
| 2005/0206345 | A1 | 9/2005 | Maskatia et al. | |
| 2008/0136375 | A1 | 6/2008 | Nam et al. | |
| 2009/0243544 | A1 * | 10/2009 | Liao .............................. | 320/128 |
| 2009/0278679 | A1 | 11/2009 | Dailey et al. | |

FOREIGN PATENT DOCUMENTS

| CN | 1670664 A | 9/2005 |
| CN | 101820171 A | 9/2010 |

OTHER PUBLICATIONS

CN Office Action dated Oct. 22, 2013.
English Abstract translation of CN Office Action dated Oct. 22, 2013.
Full English translation of CN101820171 (Published Jun. 12, 2008).

* cited by examiner

*Primary Examiner* — Richard V Muralidar
*Assistant Examiner* — David Henze-Gongola
(74) *Attorney, Agent, or Firm* — McClure, Qualey & Rodack, LLP

(57) ABSTRACT

A battery management method of an electrical device, including an internal power source and a battery management unit, includes the following steps. The battery management unit detects whether the electrical device is electrically connected with an external power source. If the electrical device is electrically connected with the external power source, the battery management unit utilizes a timer to determine whether the electrical device has been electrically connected with the external power source for a predetermined time. If the electrical device has been electrically connected with the external power source for the predetermined time, the battery management unit resets the timer and controls the internal power source to discharge fast.

16 Claims, 4 Drawing Sheets

ELECTRICAL DEVICE AND BATTERY MANAGEMENT METHOD THEREOF

This application claims the benefit of People's Republic of China application Serial No. 201110035481.6, filed Feb. 10, 2011, the subject matter of which is incorporated herein by reference.

BACKGROUND OF THE INVENTION

1. Field of the Invention

The invention relates in general to an electrical device and a battery management method thereof, and more particularly to an intelligent electrical device and a battery management method thereof.

2. Description of the Related Art

Nowadays, more and more users purchase portable electrical devices, including notebook computers, having the advantages that they can be used at any time and any place. The portable electrical devices not only provide the high convenience for the users, but also bring the user the fun of the real-time and mobile use. Among the components of the notebook computer, the battery pertains to the high-cost consumable. If the durability of the battery is longer, the cost of using the notebook computer is also lower. Therefore, it is an important subject in the industry to manage the battery of the notebook computer to maintain the activity of the battery and increase the durability of the battery.

SUMMARY OF THE INVENTION

The invention is directed to an electrical device and a battery management method thereof, wherein the durability of an internal power source is lengthened by applying the intelligent maintenance and management to the internal power source of the electrical device.

According to a first aspect of the present invention, a battery management method of an electrical device is provided. The electrical device has an internal power source and a battery management unit. The battery management method includes the following steps. The battery management unit detects whether the electrical device is electrically connected with an external power source. The battery management unit utilizes a timer to determine whether the electrical device has been electrically connected with the external power source for a predetermined time if the electrical device is electrically connected with the external power source. The battery management unit resets the timer and controls the internal power source to discharge fast if the electrical device has been electrically connected with the external power source for the predetermined time.

According to a second aspect of the present invention, an electrical device including a battery management unit, a basic input/output system (BIOS) and embedded controller (EC) and an internal power source is provided. The battery management unit detects whether the electrical device is electrically connected with an external power source. The BIOS and EC, electrically connected with the battery management unit, performs power management. The internal power source is electrically connected with the BIOS and EC. If the electrical device is electrically connected with the external power source, the battery management unit utilizes a timer to determine whether the electrical device has been electrically connected with the external power source for a predetermined time. If the electrical device has been electrically connected with the external power source for the predetermined time, the battery management unit resets the timer and controls the internal power source to discharge fast.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides an electrical device and a battery management method thereof, wherein the durability of an internal power source is lengthened by applying the intelligent maintenance and management to the internal power source of the electrical device.

Figure 1:
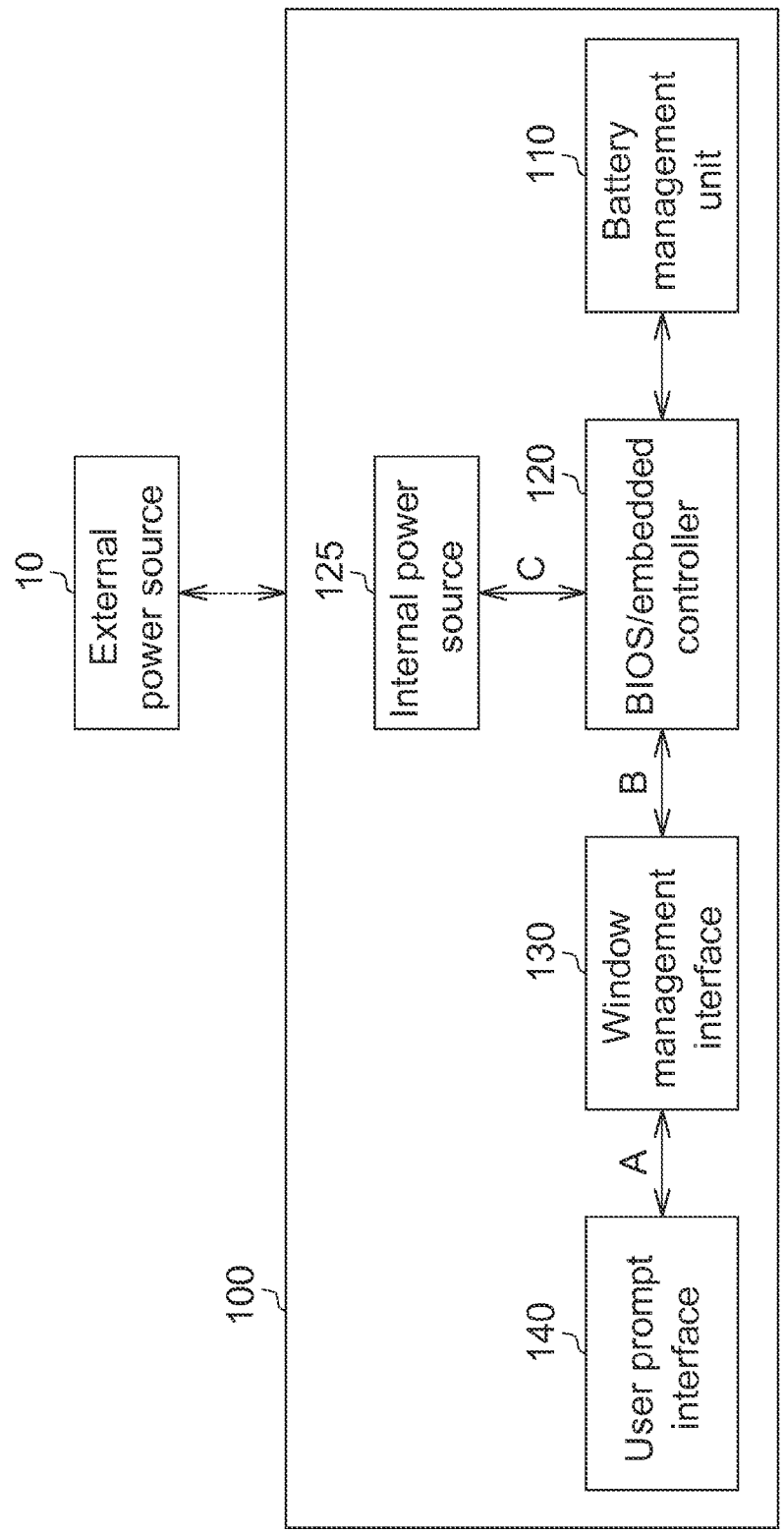
FIG. 1 is a schematic illustration showing one example of an electrical device according to an embodiment of the invention.

FIG. 1 is a schematic illustration showing one example of an electrical device 100 according to an embodiment of the invention. As shown in FIG. 1 of this embodiment, the electrical device 100 is, for example but without limitation to, a notebook computer. Any electrical device adopting the advanced configuration and power interface (ACPI) specification is adapted to the electrical device and the battery management method thereof according to the invention. The electrical device 100 includes a battery management unit 110, a basic input/output system (BIOS) and embedded controller (EC) 120 and an internal power source 125. The battery management unit 110 detects whether the electrical device 100 is electrically connected with an external power source 10, such as an AC power (e.g., mains), which may be connected to the electrical device 100 through an AC adaptor.

The BIOS and EC 120 is electrically connected with the battery management unit 110 and performs power management. The internal power source 125 is, for example, a build-in battery of the electrical device 100, and is electrically connected with the BIOS and EC 120. The information exchange C between the BIOS and EC 120 and the internal power source 125 may be implemented by the ACPI source codes. In addition, the BIOS and EC 120 can read messages of a system management bus (SMBus) to obtain the information of the internal power source 125, such as the residual power, temperature, voltage or charge/discharge current.

The battery management unit 110 performs the power management substantially through the BIOS and EC 120. The embedded controller controls the partial power management of the electrical device 100, such as entering the standby/shutdown mode, the power dispatch of the external power source system, the power detection of the intelligent battery, the charge/discharge task and the like. In addition, the power management may also be implemented through the operation of the BIOS according to the ACPI source codes. The battery management unit 110 further provides a user prompt interface 140, which is substantially a man-machine interaction window, through a window management instrumentation (WMI) 130. In FIG. 1, the information exchange B between the BIOS and EC 120 and the WMI 130 may be further compiled into a resource file through a managed object format (MOF) document. The resource file performs registration on the MOF document through the WMI 130, and thus also implements the interaction between the top software and the BIOS and EC 120. In addition, the information exchange A between the user prompt interface 140 and the WMI 130 may be implemented by a programming language (e.g., C#).

Figure 2A:
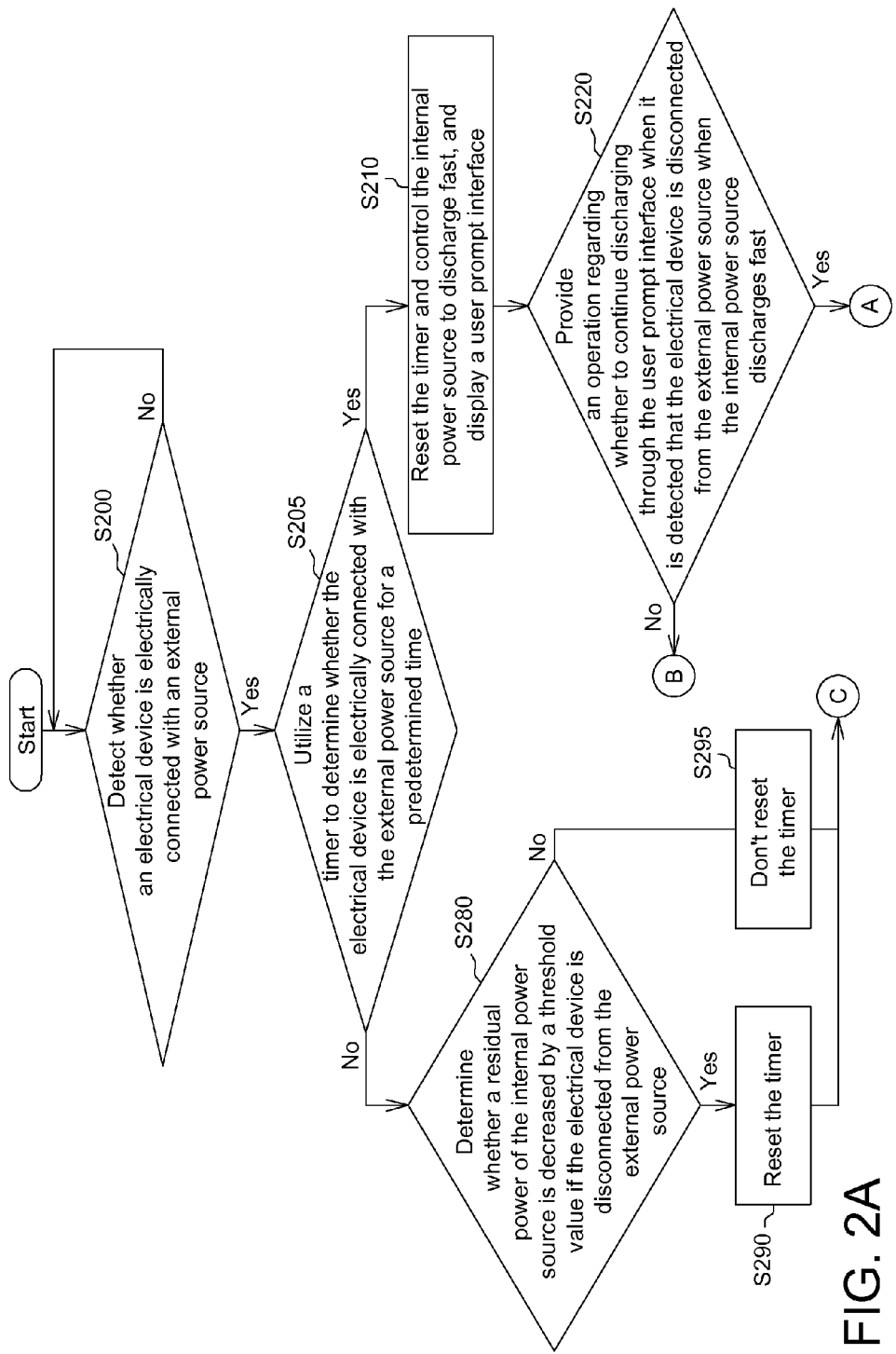
FIGS. 2A and 2B are flow charts showing a battery management method of an electrical device according to an embodiment of the invention.
Figure 2B:
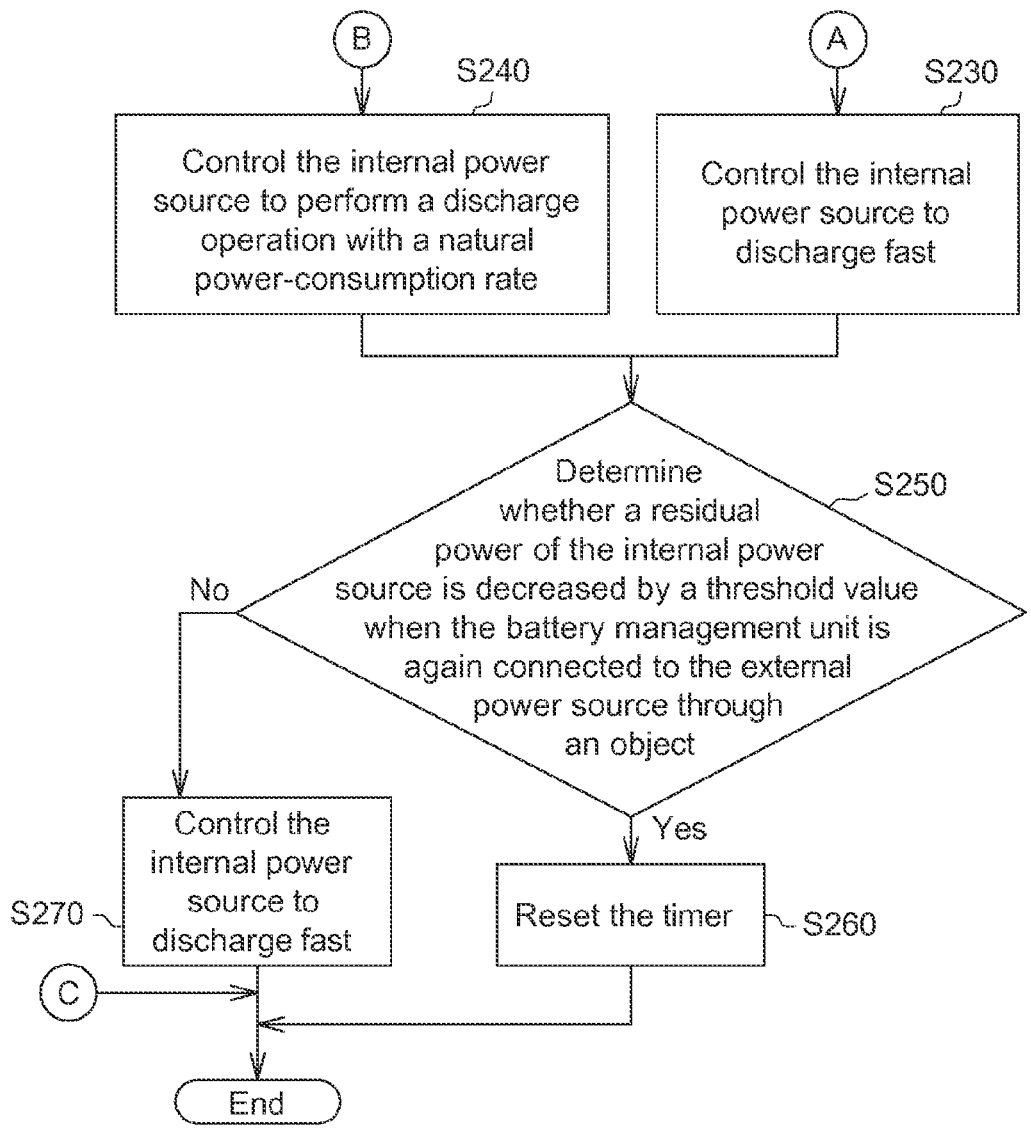

FIGS. 2A and 2B are flow charts showing a battery management method of the electrical device 100 according to an embodiment of the invention. In step S200, the battery management unit 110 of the electrical device 100 detects whether the electrical device 100 is electrically connected with the external power source 10. The battery management unit 110 detects whether the electrical device 100 is electrically connected with the external power source 10 (corresponding to the information exchange C) substantially through an ACPI object_PSR. If the electrical device 100 is electrically connected with the external power source 10, the return value of the object_PSR is, for example, 0x0000001. In addition, the battery management unit 110 may also detect whether the electrical device 100 is electrically connected with the external power source 10 by reading the memory of the embedded controller. If the electrical device 100 is electrically connected with the external power source 10, the battery management unit 110 of the electrical device 100 utilizes a timer to determine whether the electrical device 100 has been electrically connected with the external power source 10 for a predetermined time, such as but without limitation to 30 days, in step S205.

Figure 3:
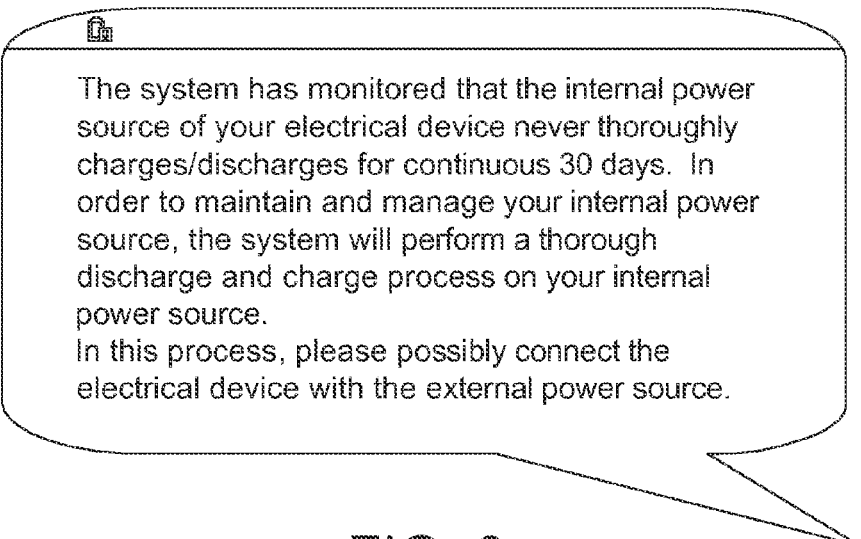
FIG. 3 is a schematic illustration showing an example of a user prompt interface according to an embodiment of the invention.

If the electrical device 100 has been electrically connected with the external power source 10 for the predetermined time, the battery management unit 110 resets the timer and controls the internal power source 125 to discharge fast in step S210, and the electrical device 100 displays the user prompt interface 140. The battery management unit 110 may utilize an ACPI object_BMC to control the internal power source 125 to perform the charge/discharge operation. In addition, the battery management unit 110 may set the system to a D0 state (corresponding to the information exchange C) through the object_PS0, and thus achieve the fast discharge. Moreover, when the battery management unit 110 controls the internal power source 125 to discharge fast, the electrical device 100 displays the user prompt interface 140 through the WMI 130 to remind the user to discharge the internal power source 125 fast (corresponding to the information exchanges B and A). FIG. 3 is a schematic but non-restrictive illustration showing an example of a user prompt interface according to an embodiment of the invention.

Figure 4:
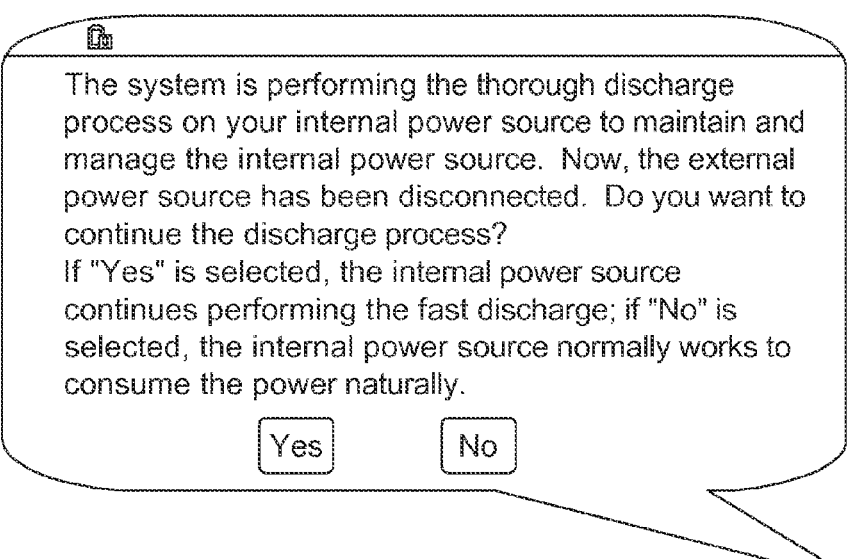
FIG. 4 is a schematic illustration showing another example of a user prompt interface according to an embodiment of the invention.

Next, in step S220, the battery management unit 110 detects that the electrical device 100 is disconnected from the external power source 10 (corresponding to the information exchange C) through the object_PSR or the memory of the embedded controller when the internal power source 125 discharges fast, the battery management unit 110 controls the BIOS to display the user prompt interface 140 through the WMI 130 to provide an operation regarding whether to continue discharging (corresponding to the information exchange A). FIG. 4 is a schematic but non-restrictive illustration showing another example of a user prompt interface according to an embodiment of the invention. When the user responds to a continuation discharge signal through the user prompt interface 140, the battery management unit 110 utilizes the object_BMC and the object_PS0 to control the internal power source 125 to discharge fast (corresponding to the information exchange C) in step S230. When the user responds to a discontinuation discharge signal through the user prompt interface 140, the battery management unit 110 utilizes the object_PS0 to control the internal power source 125 to disable the fast discharge state but performs the discharge operation (corresponding to the information exchange C) with a natural power-consumption rate in step S240.

Moreover, in step S250, when the battery management unit 110 detects that the electrical device 100 is again electrically connected with the external power source 10 through the object_PSR, the battery management unit 110 determines whether the residual power of the internal power source 125 is decreased by a threshold value (corresponding to the information exchange C) in a duration for which the electrical device 100 is disconnected from the external power source 10. The battery management unit 110 may utilize the battery state bit2 (shifted two bits leftward from the least significant bit) of the ACPI object_BST to obtain the current state of the internal power source 125 and thus to obtain the residual power, wherein the threshold value is, for example but without limitation to, 5% of the total power of the internal power source 125. In addition, the battery management unit 110 may also utilize the memory of the embedded controller to obtain the residual power of the internal power source 125. When the residual power of the internal power source 125 is decreased by the threshold value, the embedded controller may send out a system control interrupt event to inform the BIOS.

When the return value of the battery state bit2 of the object_BST is equal to 1 and the battery management unit 110 determines that the residual power of the internal power source 125 is decreased by the threshold value, it represents that the internal power source 125 has reached the sufficiently discharged standard. In step S260, the battery management unit 110 resets the timer. When the return value of the battery state bit2 of the object_BST is equal to 0 and the battery management unit 110 determines that the residual power of the internal power source 125 is not decreased by the threshold value, it represents that the internal power source 125 has not reached the sufficiently discharged standard. In step S270, the battery management unit 110 controls the internal power source 125 to discharge fast (corresponding to the information exchange C).

In addition, in the step S200, when the electrical device 100 has been electrically connected with the external power source 10 for a time, shorter than the predetermined time, the procedure enters step S280. In the step S280, if the electrical device 100 is disconnected from the external power source 10, the battery management unit 110 utilizes the battery state bit2 of the ACPI object_BST or the memory of the embedded controller to determine whether the residual power of the internal power source 125 is decreased by the threshold value (corresponding to the information exchange C). When the battery management unit 110 determines that the residual power of the internal power source 125 is decreased by the threshold value, it represents that the internal power source 125 has reached the sufficiently discharged standard. In step S290, the battery management unit 110 resets the timer. When the battery management unit 110 determines that the residual power of the internal power source 125 is not decreased by the threshold value, it represents that the internal power source 125 does not reach the sufficiently discharged standard. In step S295, the battery management unit 110 does not reset the timer.

The battery management method of the electrical device according to the embodiment of the invention has many advantages, some of which will be listed in the following.

According to the associated data, if the internal power source of the electrical device (e.g., the battery of the notebook computer) is not used for a long time, its best maintaining method is to thoroughly charge/discharge the internal power source every other predetermined time (e.g., every other month). In the battery management method of the electrical device of the invention, the software is executed to control the automatic charge/discharge operation on the internal power source of the electrical device every other predetermined time, to apply the intelligent maintenance and management to the internal power source, and thus effectively prevent the user from ignoring to maintain the internal power source. Thus, the object of lengthening the durability of the internal power source can be achieved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery management method of an electrical device, having an internal power source and a battery management unit, the battery management method comprising the steps of:
    detecting, by the battery management unit, whether the electrical device is electrically connected with an external power source;
    utilizing, by the battery management unit, a timer to determine whether the electrical device has been electrically connected with the external power source for a predetermined time if the electrical device is electrically connected with the external power source; and
    resetting, by the battery management unit, the timer and controlling, by the battery management unit, the internal power source to discharge fast if the electrical device has been electrically connected with the external power source for the predetermined time, wherein:
    if the electrical device was connected to the external power source for a time shorter than the predetermined time and then the electrical device is disconnected from the external power source, the battery management unit determines whether a residual power of the internal power source is decreased by a threshold value;
    when the battery management unit determines that the residual power of the internal power source is decreased by the threshold value, the battery management unit resets the timer; and
    when the battery management unit determines that the residual power of the internal power source is not decreased by the threshold value, the battery management unit does not reset the timer.

2. The battery management method according to claim 1, wherein the battery management unit detects whether the electrical device is electrically connected with the external power source through an advanced configuration and power interface (ACPI) object_PSR.

3. The battery management method according to claim 2, wherein the battery management unit controls the internal power source to perform a charge/discharge operation through an ACPI object_BMC.

4. The battery management method according to claim 1, wherein when the battery management unit controls the internal power source to discharge fast, the electrical device displays a user prompt interface.

5. The battery management method according to claim 4, wherein:
    when the battery management unit detects that the electrical device is disconnected from the external power source when the internal power source discharges fast, the battery management unit provides an operation regarding whether to continue discharging through the user prompt interface;
    the battery management unit controls the internal power source to discharge fast when the user prompt interface responds to a continuation discharge signal; and
    the internal power source performs a discharge operation with a natural power-consumption rate when the user prompt interface responds to a discontinuation discharge signal.

6. The battery management method according to claim 5, wherein:
    when the battery management unit detects that the electrical device is again connected to the external power source, the battery management unit determines whether a residual power of the internal power source is decreased by a threshold value in a duration for which the electrical device is disconnected from the external power source;
    when the battery management unit determines that the residual power of the internal power source is not decreased by the threshold value, the battery management unit controls the internal power source to discharge fast; and
    when the battery management unit determines that the residual power of the internal power source is decreased by the threshold value, the battery management unit resets the timer.

7. The battery management method according to claim 1, wherein the threshold value is equal to 5%.

8. The battery management method according to claim 1, wherein the battery management unit performs power management through a basic input/output system (BIOS) and embedded controller (EC) of the electrical device, and further provides a user prompt interface to perform a power management operation through a window management instrumentation (WMI).

9. An electrical device, comprising:
    a battery management unit for detecting whether the electrical device is electrically connected with an external power source;
    a basic input/output system (BIOS) and embedded controller (EC), electrically connected with the battery management unit, for performing power management; and
    an internal power source electrically connected with the BIOS and EC, wherein:
    when the electrical device is electrically connected with the external power source, the battery management unit utilizes a timer to determine whether the electrical device has been electrically connected with the external power source for a predetermined time; and
    when the electrical device has been electrically connected with the external power source for the predetermined time, the battery management unit resets the timer and controls the internal power source to discharge fast, wherein the battery management unit determines whether a residual power of the internal power source is decreased by a threshold value if the electrical device was connected to the external power source for a time shorter than the predetermined time and the electrical device is disconnected from the external power source, the battery management unit resets the timer when the battery management unit determines that the residual power of the internal power source is decreased by the threshold value, and the battery management unit does not reset the timer when the battery management unit determines that the residual power of the internal power source is not decreased by the threshold value.

10. The electrical device according to claim 9, wherein the battery management unit detects whether the electrical device is electrically connected with the external power source through an advanced configuration and power interface (ACPI) object_PSR.

11. The electrical device according to claim 10, wherein the battery management unit controls the internal power source to perform a charge/discharge operation through an ACPI object_BMC.

12. The electrical device according to claim 9, wherein when the battery management unit controls the internal power source to discharge fast, the electrical device displays a user prompt interface.

13. The electrical device according to claim 12, wherein when the battery management unit detects that the electrical device is disconnected from the external power source when the internal power source discharges fast, the battery management unit provides an operation regarding whether to continue discharging through the user prompt interface, the battery management unit controls the internal power source to discharge fast when the user prompt interface responds to a continuation discharge signal, and the internal power source performs a discharge operation with a natural power-consumption rate when the user prompt interface responds to a discontinuation discharge signal.

14. The electrical device according to claim 13, wherein when the battery management unit detects that the electrical device is again electrically connected with the external power source, the battery management unit determines whether a residual power of the internal power source is decreased by a threshold value in a duration for which the electrical device is disconnected from the external power source, the battery management unit controls the internal power source to discharge fast when the battery management unit determines that the residual power of the internal power source is not decreased by the threshold value, and the battery management unit resets the timer when the battery management unit determines that the residual power of the internal power source is decreased by the threshold value.

15. The electrical device according to claim 9, wherein the threshold value is equal to 5%.

16. The electrical device according to claim 9, wherein the battery management unit provides a user prompt interface to perform a power management operation through a window management instrumentation (WMI).

* * * * *